July 11, 1950   F. KLUSSMANN   2,515,125
DOUGH DIVIDER
Filed Feb. 19, 1949
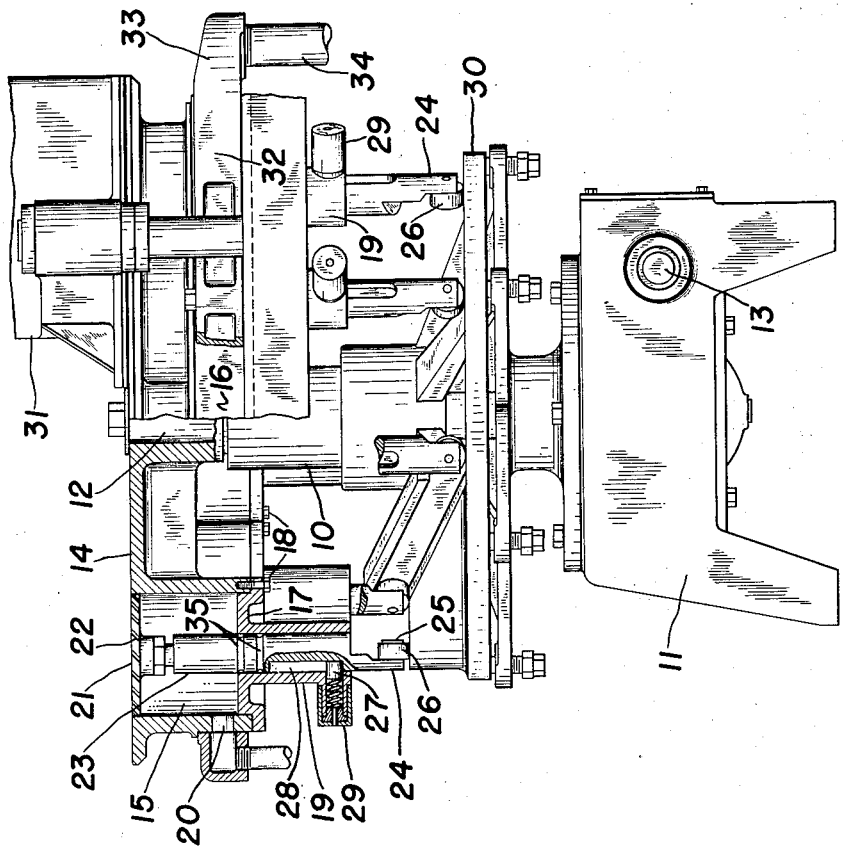
INVENTOR.
FRITZ KLUSSMANN
BY Otto Moeller
Attorney Patented July 11, 1950

2,515,125

UNITED STATES PATENT OFFICE 2,515,125

DOUGH DIVIDER

Fritz Klussmann, Buffalo, N. Y., assignor to The Standard Stoker Company, Incorporated, a corporation of Delaware Application February 19, 1949, Serial No. 77,390

2 Claims. (Cl. 107—15)

1

This invention relates to machines for dividing and scaling plastic materials, and particularly for dividing and scaling dough into proper size for use in making rolls, buns, loaves of bread and the like.

A typical dough divider to which the present invention is peculiarly adapted comprises a rotating disc provided with cylinders successively passing beneath a dough supply hopper. Each cylinder contains a piston provided with a piston rod projecting through a cylinder head forming a closure for the bottom of the cylinder and reciprocating movement is communicated to the piston by means of cam mechanism operating against the lower end of the piston rod. The piston rod is mounted in a close fitting sleeve formed with the cylinder head thereby minimizing any tendency of the piston to cock or bind in the cylinder during reciprocation thereof. The piston is in retracted position when the cylinder is beneath the hopper to receive dough therefrom, and is in projected position after the cylinder passes the hopper to eject the divided dough piece from the cylinder. In dough receiving position, the cylinder is evacuated through grooves in the piston whereby the dough is drawn into the cylinder.

It has been found in practice that small particles of dough find their way between the piston rod and the sleeve in which the piston rod reciprocates and after a time the accumulation of dough causes the piston rod to stick and to freeze in the sleeve, necessitating disassembly of the piston and cylinder assembly in order to clean the piston rod and the inside of the sleeve.

It is an object of my invention to provide an improved dough divider of the type described, wherein interruption of the divider during a run of dough is obviated; wherein disassembly of the piston assembly for purpose of cleaning can be deferred to such times when the divider is not normally in use; wherein damage to parts of the divider due to freezing of the pistons is eliminated thus resulting in reduced maintenance costs; and wherein more uniform scaling of dough balls is obtained.

Other objects and advantages will become apparent from the following description and the invention accordingly comprises the elements and combination of elements, features of construction, and arrangement of parts, hereinafter fully described and illustrated in the accompanying drawing.

In the drawings:

Figure 1 is a view of the divider in side elevation with parts broken away and shown in section to clearly illustrate the invention; and Figure 2 is an enlarged view in elevation of the piston and piston rod.

While this machine is particularly designed for the purpose of dividing dough and it is hereinafter described with particular reference to dough, it will be obvious that it can also be used for dividing other plastic materials than dough.

Referring to Figure 1 of the drawing, the divider comprises a vertical drive shaft housing 10 which is supported in any suitable manner on the gear housing 11. A vertical drive shaft 12 extends through and is mounted in the drive shaft housing 10, the lower end of the vertical drive shaft 12 projecting into the gear housing 11 and the upper end thereof projecting above the housing 10.

Suitable gearing in the gear housing 11 is provided for transmitting rotary movement to the drive shaft 12 from the horizontal power shaft 13 which is driven through well known variable speed drive means (not shown) from a suitable motor (not shown).

Keyed on the upper projecting end of vertical drive shaft 12 for rotation therewith is a circular disc or cylinder plate 14. A plurality of equidistant circularly arranged cylinders 15, preferably formed integral with the plate 14 depend therefrom adjacent the periphery thereof. An annular race 16 is integrally formed with and circumscribes the lower portions of the cylinders 15, the purpose of which will be brought out later in the description.

The bottom of each cylinder 15 is provided with a cylinder head 17 detachably secured to the cylinder in any suitable manner, as by bolts 18. Each of the cylinder heads 17 has an integrally formed and centrally disposed depending sleeve 19, opening at its upper end into its respective cylinder 15 and being also open at its lower end.

For a purpose to be later explained, each of the cylinders 15 is provided in its side wall immediately above the cylinder head 17 and remote from the axis of the plate 14 with a radial aperture 20 opening through the annular race 16.

In each of the cylinders 15 there is mounted a piston 21 arranged, as hereinafter described, to reciprocate between an up position flush with the top of plate 14 and any one of a number of predetermined down positions within the cylinder 15 above the level of the aperture 20. The periphery of the piston 21 is provided with a plurality of equidistantly spaced angular grooves 22. The number, spacing and width of the grooves 22 may be varied, but should be so designed as to permit air to pass therethrough between the piston 21 and the wall of the cylinder 15 to produce a suction in the cylinder 15 to draw the dough to be divided and scaled, into the cylinder 15 but to retard passage of the dough through the grooves 22.

Reciprocating movement is communicated to the piston 21 through the piston rod 23 which is threaded at one end in the piston 21 and extends therefrom through the cylinder head 17 and sleeve 19, projecting beyond the lower end of the sleeve 19. The piston rod 23 is provided at its lower end with a reduced peripheral portion 24 having a radially inwardly extending stud 25 at right angles with respect to the axis of the piston rod 23, and on the stud 25 is rotatably mounted a roller 26. This roller assembly is so constructed and arranged as not to project laterally beyond the circumference of the piston rod 23, whereby the piston assembly may be conveniently removed and replaced from the top of the plate 14 without disturbing or disassembling any other parts of the divider mechanism.

A latching arrangement is provided for preventing rotary movement of the piston rod 23, comprising a spring pressed plunger 27 arranged to engage a keyway 28 of the piston rod 23 preventing the latter from rotating while permitting reciprocating movement thereof. A cap 29 secured to the outer end of the plunger 27 provides means for manually pulling the plunger 27 out of engagement with the keyway 28, thereby permitting removal or replacement of the piston assembly.

Ring-shaped cam mechanism 30 of well known design, is supported from the drive shaft housing 10 beneath cylinder and piston assembly, providing track or guide means on which the roller 26 of the piston assembly runs as the cylinder plate 14 rotates to effect reciprocation of the piston rod 23 and piston 21.

A dough hopper 31 is suspended over one side of the cylinder plate 22 in any suitable manner, above the low side of the cam mechanism 30, so that as the cylinder plate 14 rotates, the cylinders 15 are brought beneath the hopper 31 with their pistons 21 in depressed position, or in other words in position to receive dough from the hopper 31. The dough is drawn into the cylinders 15 by evacuating the air from the space above the pistons 21 through the grooves 22 and from the space beneath the pistons 21 through the apertures 20 in the walls of the cylinders 15.

The cylinder evacuating means includes a stationary port ring 32 surrounding and fitting closely against the annular race 16. The port ring 32 is provided with a chamber 33 disposed in that portion of port ring 32 immediately beneath the hopper 31. The inner side of the chamber 33 is open so that the cylinders 15 successively communicate with the chamber 33 through their respective apertures 20. The chamber 33 is connected by means of suitable tubing 34 with a source of vacuum (not shown).

Upon continued rotation of the cylinder plate 14 after one of its cylinders 15 passes from beneath the hopper 31, the cylinder piston 21 is raised until it is flush with the surface of the cylinder plate 14. Raising of the piston 21 is effected through travel of the roller 26 of the piston assembly along the high part of the cam mechanism 30. The divided and scaled dough piece which is thus ejected from the cylinder 15 is removed from the cylinder plate 14 in any well known manner.

The piston rod 23 is provided with one or more circumferential grooves 35, two being shown by way of example. The uppermost of the grooves 35 is so located that, when the piston 21 is at the top of its stroke, the groove just fails to emerge into the cylinder 15. The edges 36 defining the grooves 35 are preferably sharp to facilitate their objective of scraping off dough that finds its way between the piston rod 23 and the sleeve 19.

The grooves 35 form repositories for the dough so scraped off by the sharp edges 36, whereby sticking and freezing of the piston rod 23 in the sleeve 19 is prevented. The divider may thus be operated for long periods with no danger of interruption, insures accurate scaling of dough pieces, and minimizes repair and maintenance on the machine. At such times that the divider is not normally in use, the piston assembly may be conveniently removed and the accumulation of dough in the grooves 35 cleaned out.

I claim:
1. A dough divider comprising a stationary hopper, a horizontal disc carrying cylinders revolving under said hopper, a cylinder head for the lower end of each of said cylinders, said cylinder heads being provided with elongated bearing sleeves, a piston in each of said cylinders, said pistons being provided with piston rods mounted in and extending through said bearing sleeves, means to reciprocate said piston rods, said piston rods being provided with annular grooves, the uppermost of said grooves being disposed with the peripheral edge of the piston rod defining the upper circumferential edge of said groove being substantially flush with the inner wall surface of said cylinder head at the end of the ejecting stroke of the piston, the peripheral edges of said piston rods defining said grooves being sharp to form scraping edges for removing dough particles adhering to the inner wall of said bearing sleeves, and said grooves forming repositories for the dough particles scraped from said bearing sleeve wall.

2. In a dough divider, a cylinder open at one end adapted to receive dough, a cylinder head for the other end of said cylinder having an elongated bearing sleeve, a reciprocable piston in said cylinder for ejecting the dough therefrom, a piston rod for said piston mounted in and extending through said bearing sleeve, said piston having a circumferential annular groove, said annular groove being disposed with the peripheral edge of the piston rod defining the side of the groove nearest the piston being substantially flush with the inner wall of said cylinder head at the end of the ejecting stroke of the piston, the peripheral edges of said piston rods defining said groove forming scraping edges for removing dough particles adhering to the inner wall of said bearing sleeve, and said groove forming a repository for the dough particles scraped from said bearing sleeve wall.

FRITZ KLUSSMANN.

REFERENCES CITED

The following references are of record in the file of this patent:

UNITED STATES PATENTS

| Number | Name | Date |
|---|---|---|
| 758,763 | Lutze | May 3, 1904 |
| 1,784,113 | Schiff | Dec. 9, 1930 |
| 1,966,147 | Steere | July 10, 1934 |
| 2,183,977 | Sopchack | Dec. 19, 1939 |
| 2,273,219 | Rhodes | Feb. 17, 1942 |

FOREIGN PATENTS

| Number | Country | Date |
|---|---|---|
| 474,276 | Germany | June 18, 1929 |